Jan. 30, 1945.   R. J. L. LEE   2,368,226
COMPARATIVE DATA FILE
Filed Feb. 3, 1943   2 Sheets—Sheet 1
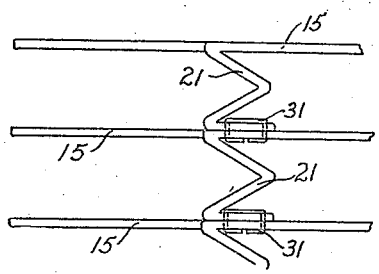
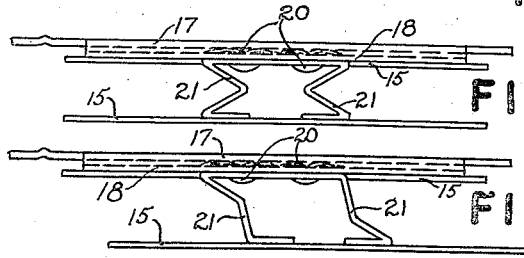
INVENTOR
ROBERT J. L. LEE
BY
ATTORNEYS Jan. 30, 1945. R. J. L. LEE 2,368,226
COMPARATIVE DATA FILE
Filed Feb. 3, 1943 2 Sheets-Sheet 2
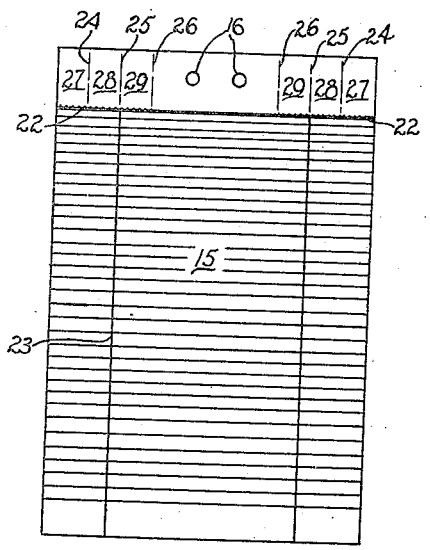
FIG. 7
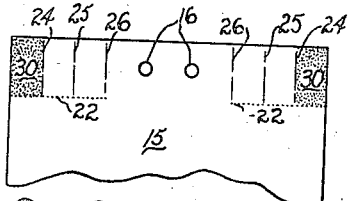
FIG. 8
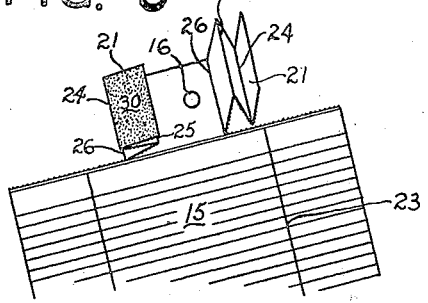
FIG. 9
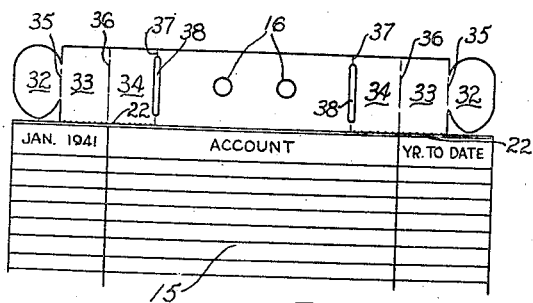
FIG. 10
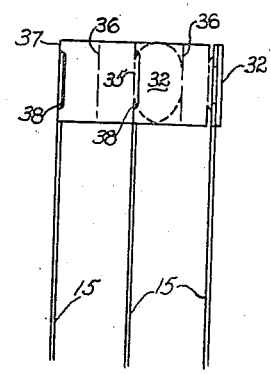
FIG. 11
FIG. 12
INVENTOR
ROBERT J. L. LEE
BY
ATTORNEYS Patented Jan. 30, 1945

2,368,226

UNITED STATES PATENT OFFICE 2,368,226

COMPARATIVE DATA FILE

Robert J. L. Lee, Cleveland, Ohio, assignor to The McBee Company, Athens, Ohio, a corporation of Ohio Application February 3, 1943, Serial No. 474,507

5 Claims. (Cl. 129—16.5)

This invention relates to files. More particularly it relates to comparative data files of a type generally illustrated in United States Patents Nos. 2,295,951 and 2,295,952 issued to Cedric F. Gove and Jesse M. Jones, September 15, 1942.

In files of this general type, each sheet carries a column at each edge, and in which entries are made so that each sheet corresponds to a certain period of time. The sheets are then shifted laterally into an echeloned arrangement, so that the corresponding columns adjacent the same edge of the juxtaposed sheets are exposed alongside of each other. In this way monthly totals in a business, or similar entries over a considerable time can be displayed for comparison alongside of each other.

One of the objects of the present invention is to provide a file for housing sheets containing entries extending over different periods of time, and which are connected together in such a way that they can be moved laterally into an echeloned position so that entries on corresponding columns and lines of the different sheets can be seen and compared simultaneously.

Another object of this invention is to provide a simple and effective guiding means for connecting the sheets and which will keep them properly aligned with each other in a direction across the sheets, when they are fully extended and may number twelve or more to cover a period of time such as a year.

Another object resides in the construction of a means for connecting the sheets together which is formed as an integral part of each sheet, and which provides efficiency in operation as well as economy in manufacture.

Another object resides in the provision of non-metallic connections between the sheets enabling them to be held in juxtaposed position and extended in echeloned arrangement when desired. •An advantage arising from the use of a connecting means which is non-metallic in character is readily apparent since the present scarcity of metals has made it practically impossible to secure metals for clips or splints of a type heretofore used and as disclosed in the above named patents.

Other objects and advantages of this invention will be apparent from the following description, the appended claims, and the accompanying drawings.

In the drawings, in which only a few preferred embodiment of the invention have been illustrated:

Fig. 1 is a plan view showing a folder housing a file of twelve sheets corresponding to the different months of the year, said sheets embodying one form of the present invention and being shifted to the right in echeloned arrangement so as to expose the month column alongside of each other at the left side of the sheets;

Fig. 2 is a view similar to Fig. 1, illustrating the sheets in echeloned arrangement, but shifted toward the left so as to expose the right-hand columns on the sheets alongside of each other;

Fig. 3 is a view similar to Fig. 1, representing two files built up for only a few months of the year, and illustrating how the sheets for succeeding months are applied to build up a complete file for all the months, or longer periods, if desired.

Fig. 4 is a fragmentary top edge plan view, with the thickness of the sheets exaggerated so as to illustrate the connecting means more clearly, of the folder shown in Fig. 1;

Fig. 5 is a view similar to Fig. 4, and illustrating the sheet displaced to the right in echelon with respect to the backing sheet;

Fig. 6 is fragmentary top edge plan view of several sheets, the thickness of which is exaggerated for the sake of clarity, illustrating another form of the means that may be used for connecting the sheets;

Fig. 7 is an enlarged front elevation of a single sheet illustrating one preferred form only of the arrangement of scored and perforated lines employed in the present invention;

Fig. 8 is a fragmentary rear elevation showing the reverse side of the sheet illustrated in Fig. 7;

Fig. 9 is a perspective view of the sheet of Fig. 7 illustrating the means of tearing and folding the upper edge in accordance with the present invention;

Fig. 10 is a fragmentary front elevation of a sheet similar to that of Fig. 7, but illustrating a modified form of the invention;

Fig. 11 is a fragmentary side edge elevation of several sheets, exaggerated in thickness, and illustrating the means of connecting sheets as shown in Fig. 10; and Fig. 12 is a fragmentary front elevation of sheets assembled as shown in Fig. 11.

Referring now more particularly to the drawings by reference numerals, the sheets, generally indicated by the numeral 15 in the various figures, are preferably of a type commonly provided with a row of perforations 16 along the top edge enabling them to be inserted in loose-leaf binders. However, it is not essential to this invention that the sheets used be perforated in this manner. The sheets 15 used are commonly provided with printed vertical columns and headings for different months, or other preferred periods of time, and have printed horizontal lines on which the various entries are made opposite items on the body of the sheet. Since sheets of this type are well known in business and have been described in the above referred to patents, no further description of them is deemed necessary at this time.

A folder or file cover 17 of any suitable material is provided to house sheets 15. This folder is preferably of a character such that when opened and spread flat one side thereof has a flap 18 to which the first sheet of the file is attached, the other side of the folder serving as a cover which may be folded over the filed sheets when they are in a juxtaposed position. This is the arrangement where the sheets are to be attached to each other at their upper edges, although, of course, if desired, the sheets may be attached together at their bottom edges, in which case they would be attached to a bottom flap 19 similar to flap 18, but projecting upwardly from the lower edge of the folder 17. See Fig. 3. As shown in Figs. 4 and 5, the first sheet of the file of sheets 15 is fastened to flap 18 by means of commonly used self-piercing paper fasteners or staples 20 inserted through perforations 16 in the sheet.

Guide means are provided in accordance with this invention for attaching the sheets together so that they are capable of assuming a more or less exactly juxtaposed position, and in addition are capable of being shifted laterally to the right or left into an echeloned arrangement as desired. These guide means, generally indicated by the reference numeral 21 in Figs. 4, 5, 6, and 9, are formed from a portion of the sheet 15.

At the time the sheet 15 is printed a perforated line 22 is made extending horizontally into the sheet from each side edge a distance equal to approximately one and one-half times the width of the column 23 which is to be exposed. See Figs. 7 and 8. Vertical scored lines 24, 25 and 26 are also provided extending from the top edge of the sheet down to meet the perforated line 22 so as to form areas 27, 28 and 29 each approximately equal in width to one-third of the length of perforated line 22. On the reverse side of each sheet 15, see Fig. 8, the areas 27 are covered with an adhesive surface 30 such as commonly used on envelope flaps and the like for sealing purposes, and which upon being moistened will readily adhere to a dry surface.

As will be understood by those familiar with the printing industry a perforated line, such as line 22 described above, provides a weakened surface or tear line in the paper so that it can be readily separated or torn in a desired direction and manner; while a scored line, not being so deeply cut into the paper, provides a folding line which does not tear easily.

In order to connect the sheets together, each sheet is torn on both side edges along perforated line 22 and the resulting strip along the top edge folded as illustrated in Fig. 9. This is accomplished; for example, on the left side of the sheet by first folding area 29 down flat to the right on scored line 26, and while holding it in this position then folding area 28 to the left on scored line 25, and then folding area 27 to the right on scored line 24. This folding brings the adhesive area 30 on the reverse side of area 27 to the front as shown in Fig. 9. Of course, the folding for the right hand side of the sheet would be in reverse to that just described. That is, on the right side, area 29 is folded to the left on line 26, then area 28 is folded to the right on line 25, and area 27 to the left on line 24, which then brings adhesive area 30 to the front. Upon moistening this adhesive area 30, a sheet may be fastened to the back of an adjoining sheet as shown in Figs. 4 and 5. To assure the proper alignment of the sheets so that they will lie in a juxtaposed position and readily shift into an echeloned arrangement in either direction, both adhesive areas 30 are fastened to the back of the next adjoining sheet with their outside edges, corresponding with the scored lines 24, aligned with scored lines 26 of the next sheet.

If it is necessary to provide two or more related files, as illustrated in Fig. 3, the sheets 15 of one of the files are attached to flap 18 while the second file of sheets is similarly attached to bottom flap 19. With this arrangement it is possible to shift one of the files of sheets toward the right, and the other file to the left whereby further comparisons of entries can be made if desired.

In Fig. 6 is illustrated a modified means for attaching the guide means 21 between the sheets 15. The folded areas 27, in this modification, are not provided with adhesive material on the reverse side. In place thereof wire staples 31, such as commonly used in business offices for clipping papers together are used as fastening means to connect sheet area 27 to the back of an adjoining sheet.

Figs. 10, 11 and 12 illustrate another modification of the means used for connecting and guiding the sheets 15. As above described in connection with Fig. 7, each sheet is provided with perforated lines 22 and that portion of the sheet above these lines is divided into three areas 32, 33 and 34 by means of scored lines 35, 36 and 37. However, in this modification the upper outside corners of each sheet, areas 32, are cut to form elliptical-shaped tabs as shown in Fig. 10. Elongated slots 38 cut clear through each sheet are also provided for purpose hereafter described.

To connect the sheets together each one is torn or, if preferred, cut along the perforated lines 22 and the resulting strips along the top edge are folded on the scored lines 35, 36 and 37 in the same manner as above described for Fig. 9. Tabs 32 are then inserted through the slots 38 of the adjoining sheet. It will be readily apparent that because of the shape of tabs 32 they will not be easily disengaged after once being inserted through the slots and pressed down as shown in Fig. 12.

While the devices herein described constitute preferred embodiments of the invention, it is to be understood that the invention is not limited to these precise devices and that changes may be made therein without departing from the scope of the invention which is defined in the appended claims.

Having thus described my invention, I claim:

1. An article of manufacture comprising a sheet having vertical columns adjacent to its left and right edges to facilitate comparisons of entries of data extending through different time periods, tear lines extending a predetermined distance inwardly from each side of the sheet and parallel to the top edge, and a series of parallel fold lines extending from said tear lines to the top of the sheet and dividing those portions of the sheet above the tear lines into substantially equal sections, said sections being foldable along the said fold lines so as to superimpose one upon another.

2. An article of manufacture comprising a sheet having vertical columns adjacent to its left and right edges to facilitate comparisons of entries of data extending through different time periods, tear lines parallel to the top and extending inwardly from each side of the sheet a distance equal to one and one-half times the width of one of the vertical columns, and a series of parallel fold lines extending from said tear lines to the top of the sheet and dividing those portions of the sheet above the tear lines into substantially equal sections, the outer of said sections being cut in the form of an insertable tab.

3. In a file adapted to facilitate comparisons of entries of data, the combination of: a plurality of sheets having vertical columns for entries adjacent to their left and right edges; and means for connecting the sheets permitting relative lateral shifting of the sheets in either direction so as to enable the sheets to be held in echelon with the left columns of all sheets exposed to view and also in an oppositely shifted relation so that the sheets are held in echelon with the right columns of all the sheets exposed to view, said means comprising alternately folded sections carried by each sheet with said sheets being superimposed one upon another, the upper section of a lower sheet being fastened to the lower section of the next adjoining sheet.

4. In a file adapted to facilitate comparisons of entries of data, the combination of: a plurality of sheets having vertical columns for entries adjacent to their left and right side edges; and means for connecting the sheets permitting relative lateral shifting of the sheets in either direction so as to enable the sheets to be held in echelon with the left columns of all sheets exposed to view and also in an oppositely shifted relation so that the sheets are held in echelon with the right columns of all the sheets exposed to view, said means comprising a strip formed along one end edge of each sheet, each strip being alternately folded into substantially equal superimposed sections, the outer section of which is fastened to the back of an adjoining sheet.

5. In a file adapted to facilitate comparisons of entries of data, the combination of: a plurality of sheets having vertical columns for entries adjacent to their left and right edges; and means for connecting the sheets permitting relative lateral shifting of the sheets in either direction so as to enable the sheets to be held in echelon with the left columns of all sheets exposed to view and also in an oppositely shifted relation so that the sheets are held in echelon with the right columns of all the sheets exposed to view, said means comprising a hinge member having securing portions for respective attachment to the opposed surface of adjacent sheets and also having at least two folded portions joined to each other and to said respective securing portions.

ROBERT J. L. LEE.